(12) United States Patent
Yoshikawa et al.

(10) Patent No.: US 10,153,509 B2
(45) Date of Patent: Dec. 11, 2018

(54) ELECTRODE, AND FUEL CELL AND WATER TREATMENT EQUIPMENT EACH USING SAME

(71) Applicant: Panasonic Corporation, Osaka (JP)

(72) Inventors: Naoki Yoshikawa, Osaka (JP); Yuuki Kitade, Osaka (JP)

(73) Assignee: Panasonic Corporation, Osaka (JP)

( * ) Notice: Subject to any disclaimer, the term of this patent is extended or adjusted under 35 U.S.C. 154(b) by 84 days.

(21) Appl. No.: 15/324,848

(22) PCT Filed: Sep. 7, 2015

(86) PCT No.: PCT/JP2015/004518
§ 371 (c)(1),
(2) Date: Jan. 9, 2017

(87) PCT Pub. No.: WO2016/038866
PCT Pub. Date: Mar. 17, 2016

(65) Prior Publication Data
US 2017/0207474 A1    Jul. 20, 2017

(30) Foreign Application Priority Data

Sep. 11, 2014 (JP) .................. 2014-185340

(51) Int. Cl.
*H01M 8/16* (2006.01)
*H01M 4/86* (2006.01)
(Continued)

(52) U.S. Cl.
CPC .............. *H01M 8/16* (2013.01); *C02F 3/005* (2013.01); *H01M 4/8605* (2013.01);
(Continued)

(58) Field of Classification Search
CPC ......... H01M 8/16; H01M 4/926; C02F 3/005; C02F 2101/30
(Continued)

(56) References Cited

U.S. PATENT DOCUMENTS

2009/0253012 A1    10/2009    Kambara
2011/0039164 A1    2/2011    Akers et al.
(Continued)

FOREIGN PATENT DOCUMENTS

JP    2001-145896 A    5/2001
JP    2008-181797 A    8/2008
(Continued)

OTHER PUBLICATIONS

Extended European Search Report for related European Application No. 15839831.3 dated Jun. 6, 2017.
(Continued)

*Primary Examiner* — Gary D Harris
(74) *Attorney, Agent, or Firm* — Renner, Otto, Boisselle & Sklar, LLP

(57) ABSTRACT

An electrode includes a first diffusion layer (11) having water repellency and functioning to diffuse oxygen, and a second diffusion layer (13) supporting a catalyst layer (30) thereon and functioning to diffuse oxygen. The electrode further includes an electrically conductive layer (12, 15) including a metal material (20, 21) and an oxygen-permeable material, and interposed between the first diffusion layer and the second diffusion layer. A fuel cell (100) and a water treatment equipment each include: an anode (3); an ion transfer layer (4) having proton permeability; and a cathode (1, 2) being the electrode described above, and separated from the anode with the ion transfer layer interposed therebetween.

13 Claims, 6 Drawing Sheets

(51) Int. Cl.
    *C02F 3/00*   (2006.01)
    *H01M 4/92*   (2006.01)
    *C02F 101/30* (2006.01)
    *C02F 1/461*  (2006.01)

(52) U.S. Cl.
    CPC ... *H01M 4/926* (2013.01); *C02F 2001/46133* (2013.01); *C02F 2001/46166* (2013.01); *C02F 2101/30* (2013.01); *Y02E 60/527* (2013.01)

(58) Field of Classification Search
    USPC .................................................. 429/8
    See application file for complete search history.

(56) References Cited

U.S. PATENT DOCUMENTS

| 2011/0229742 | A1* | 9/2011 | Shechter | C02F 1/46109 429/2 |
| 2015/0093601 | A1  | 4/2015 | Shechter et al. | |

FOREIGN PATENT DOCUMENTS

| JP | 2012-507828 A | 3/2012 |
| JP | 2015-046361 A | 3/2015 |
| WO | WO 2007/147947 A2 | 12/2007 |

OTHER PUBLICATIONS

X, Zhang et al.; "Enhanced Activated Carbon Cathode Performance for Microbial Fuel Cell by Blending Carbon Black"; Environmental Science & Technology; 48(3), pp. 2075-2081; 2014.

International Search Report for corresponding International Application No. PCT/JP2015/004518 dated Nov. 17, 2015.

Form PCT/ISA/237 for corresponding International Application No. PCT/JP2015/004518 dated Nov. 17, 2015.

International Preliminary Report on Patentability for corresponding International Application No. PCT/JP2015/004518 dated Dec. 27, 2016.

* cited by examiner

ELECTRODE, AND FUEL CELL AND WATER TREATMENT EQUIPMENT EACH USING SAME

TECHNICAL FIELD

The present invention relates to an electrode, and a fuel cell and a water treatment equipment each using the same.

BACKGROUND ART

Microbial fuel cells, which convert organic matter into electrical energy by use of microorganisms, mainly include an anode, an ion transfer layer, and a cathode. The anode functions to collect electrons generated when the organic matter is oxidized and decomposed by the microorganisms. The electrons collected in the anode are transferred to the cathode, and consumed through a reduction reaction. The electrons flow across the both electrodes according to a gradient of an oxidation-reduction potential due to a chemical reaction caused in the both electrodes. Hydrogen ions subsidiarily generated by the reaction in the anode pass through the ion transfer layer to reach the cathode. The hydrogen ions react with the electrons and oxygen in the cathode to produce water.

In order to ensure higher output power of microbial fuel cells, apparatuses are required to be scaled up. However, an increase in internal resistance of the fuel cells caused with the increase in size leads to anxiety about a reduction of output power of electrical energy generated.

Non Patent Literature 1 discloses a microbial fuel cell which includes a cathode including a diffusion layer, a catalyst layer, and a metal current collecting layer arrange in order from a gas phase side. Non Patent Literature 1 further discloses that the metal current collecting layer in the cathode is exposed to a liquid phase. According to Non Patent Literature 1, the use of metal as an electrically conductive material can decrease an internal resistance and ensure higher output power in association with an increase in size.

CITATION LIST

Non Patent Literature

Non Patent Literature 1: X. Zhang, et al., "Enhanced Activated Carbon Cathode Performance for Microbial Fuel Cell by Blending Carbon Black", Environ. Sci. Technol., 48(3), pp. 2075-2081, 2014.

SUMMARY OF INVENTION

In the microbial fuel cell disclosed in Non Patent Literature 1, since the metal current collecting layer in the cathode is located on the liquid phase side, the metal current collecting layer is affected by corrosion caused by a component of the liquid phase itself, such as hydrogen ions or chloride ions, or corrosion caused by microorganisms. The influence of corrosion may result in a reduction of current collecting performance of the metal current collecting layer to further lead to deterioration of the cell characteristics.

The present invention has been made in view of the above-described conventional problems. An object of the present invention is to provide an electrode capable of minimizing an internal resistance of a cell while being prevented from corrosion derived from a liquid phase, and a fuel cell and a water treatment equipment using the electrode.

In order to solve the problems described above, an electrode according to a first aspect of the present invention includes a first diffusion layer having water repellency and functioning to diffuse oxygen, and a second diffusion layer supporting a catalyst layer thereon and functioning to diffuse oxygen. The electrode further includes an electrically conductive layer including a metal material and an oxygen-permeable material, and interposed between the first diffusion layer and the second diffusion layer.

A fuel cell according to a second aspect of the present invention includes: an anode; an ion transfer layer having proton permeability; and a cathode being the electrode according to the first aspect, and separated from the anode with the ion transfer layer interposed therebetween.

A water treatment equipment according to a third aspect of the present invention includes: an anode; an ion transfer layer having proton permeability; and a cathode being the electrode according to the first aspect, and separated from the anode with the ion transfer layer interposed therebetween.

DESCRIPTION OF EMBODIMENTS

Hereinafter, an electrode, and a fuel cell and a water treatment equipment using the electrode according to the present embodiment will be described with reference to the drawings. The embodiments described below show preferred specific examples of the present invention. The numerical values, shapes, materials, elements, and arrangement and connection of the respective elements described in the following embodiments are examples and not intended to limit the present invention. The elements shown in the following embodiments but not recited in independent claims representing the most generic concept of the present invention will be described as optional elements composing more preferred embodiments.

First Embodiment (1-1. Configuration of Electrode)

First, a configuration of an electrode is described in detail below. The electrode according to the present embodiment is applicable to cathodes for fuel cells, for example, and particularly applied to a cathode for a microbial fuel cell (MFC). The electrode according to the present embodiment is thus described in the case of being used as a cathode for a microbial fuel cell.

A microbial fuel cell, which converts organic matter into electrical energy by use of microorganisms, mainly includes an anode, an ion transfer layer, and a cathode. The anode functions to collect electrons generated when the organic matter in an electrolysis solution is oxidized and decomposed by the microorganisms. The electrons collected in the anode are transferred to the cathode, and consumed through a reduction reaction. The electrons flow across the both electrodes according to a gradient of an oxidation-reduction potential due to a chemical reaction caused in the both electrodes. Hydrogen ions subsidiarily generated by the reaction in the anode pass through the ion transfer layer to reach the cathode. The hydrogen ions react with the electrons and oxygen in the cathode to produce water. The configuration and reaction described above allow the microbial fuel cell to output electrical energy while purifying waste liquid by the microorganisms.

The cathode 1 according to the present embodiment is used for the microbial fuel cell, for example, and functions as a gas diffusion electrode for promptly supplying oxygen in the air.

Figure 1:
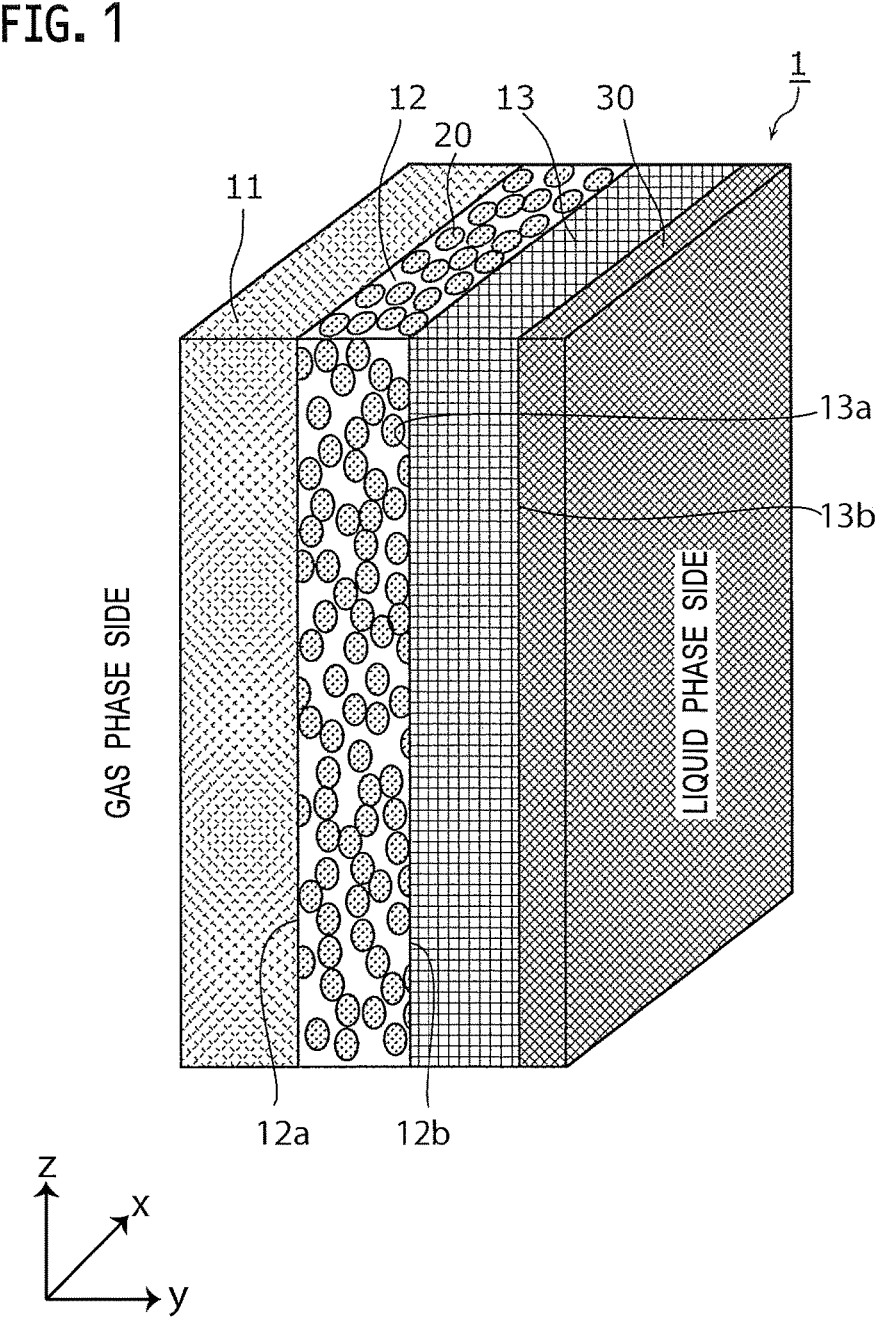
FIG. 1 is a perspective view showing an example of a cathode according to a first embodiment.

FIG. 1 is a perspective view showing an example of the cathode according to the first embodiment. As shown in FIG. 1, the cathode 1 includes a first diffusion layer 11, an electrically conductive layer 12, and a second diffusion layer 13. A catalyst layer 30 is supported on the surface of the second diffusion layer 13. The first diffusion layer 11 is arranged toward a gas phase, the second diffusion layer 13 is arranged toward a liquid phase, and the electrically conductive layer 12 is interposed between the first diffusion layer 11 and the second diffusion layer 13. More particularly, the cathode 1 includes the first diffusion layer 11 arranged in contact with one surface 12a of the electrically conductive layer 12, and the second diffusion layer 13 arranged in contact with the other surface 12b opposite to the one surface 12a of the electrically conductive layer 12. As used herein, the gas phase is, for example, the atmosphere containing oxygen, and the liquid phase is, for example, an aqueous solution or waste liquid containing organic matter and microorganisms.

The first diffusion layer 11 has water repellency and functions to disperse oxygen contained in the gas phase. A preferred example of the material used for the first diffusion layer 11 is a nonwoven fabric or film including at least one material selected from the group consisting of polyethylene, polypropylene, nylon, and polytetrafluoroethylene (PTFE). As used herein, the term "nonwoven fabric" refers to a sheet material formed of fibrous substances, namely a fibrous fabric, obtained such that fibrous substances are bonded or intertwined together by thermal, mechanical or chemical processing.

The first diffusion layer 11, which is a nonwoven fabric or film formed of hydrophobic fibrous substances, is provided with water repellency. As used herein, the term "water repellency" represents a property that repels polar organic liquid such as water or short-chain alcohol. The first diffusion layer 11 having water repellency can therefore supply oxygen in the gas phase promptly to the electrically conductive layer 12 and the second diffusion layer 13, while being prevented from corrosion caused by a component of the liquid phase itself, such as hydrogen ions or chloride ions, or corrosion caused by microorganisms. This property can prevent degeneration of the first diffusion layer 11 caused by moisture contained in the gas phase. This property can further prevent liquid leakage from the liquid phase toward the gas phase through the first diffusion layer 11.

The first diffusion layer 11 may be obtained such that the nonwoven fabric or film is coated or impregnated with a water-repellent auxiliary agent. This further enhances the water repellency of the first diffusion layer 11. Examples of such water-repellent auxiliary agents include a fluoride-based polymer material, and a silicone polymer material such as poly(dimethylsiloxane) (PDMS).

The electrically conductive layer 12 is a plate-like layer interposed between the first diffusion layer 11 and the second diffusion layer 13. The electrically conductive layer 12 is formed of a metal material and an oxygen-permeable material. The electrically conductive layer 12 is not in direct contact with the liquid phase since the second diffusion layer 13 is interposed between the electrically conductive layer 12 and the liquid phase. The electrically conductive layer 12 is therefore prevented from corrosion caused by a component of the liquid phase itself, such as hydrogen ions or chloride ions, or corrosion caused by microorganisms. As shown in FIG. 1, the electrically conductive layer 12 has a configuration in which the metal material 20 is dispersed in the oxygen-permeable material, so that the electrically conductive layer itself has oxygen permeability. The electrically conductive layer 12 can therefore allow oxygen to pass therethrough to be supplied from the gas phase via the first diffusion layer 11 toward the second diffusion layer 13 with high efficiency.

The electrically conductive layer 12 functions to transmit electrons generated in the anode, and promote a reaction between oxygen supplied from the gas phase and hydrogen ions transferred through the ion transfer layer. The electrically conductive layer 12 includes the metal material of which ingredients are electrically connected to each other inside the electrically conductive layer 12. Accordingly, the electrically conductive layer 12 exhibits high electrical conductivity with low resistance, so as to increase the efficiency of the reduction reaction of oxygen.

As shown in FIG. 1, the electrically conductive layer 12 includes the metal material 20 which has a particle shape, for example. The thickness of the electrically conductive layer 12 is preferably 1 mm or less, for example. The particle diameter of the metal material 20 is therefore preferably 1 mm or less. The lower limit of the particle diameter of the metal material 20 is preferably, but not necessarily, 1 μm or greater, for example. The particle diameter of the metal material 20 and the thickness of the electrically conductive layer 12 may be measured through observations with an optical microscope or a scanning electron microscope.

The metal material 20 may be formed of any material which can increase the electrical conductivity of the electrically conductive layer 12. The metal material 20 is preferably at least one material selected from the group consisting of aluminum, copper, stainless steel, nickel and titanium.

The electrically conductive layer 12 includes the oxygen-permeable material. The oxygen-permeable material in the electrically conductive layer 12 is preferably silicone, for example. Silicone is a material which has high oxygen permeability, is low in cost, and easy to handle. The oxygen-permeable material is also preferably at least one compound selected from the group consisting of poly(dimethylsiloxane), ethyl cellulose, poly-4-methylpentene-1, polybutadiene, polytetrafluoroethylene, and butyl rubber.

The metal material included in the electrically conductive layer 12 may have a wire shape, a flake shape, or a mesh shape, instead of a particle shape. The wire shape is a linear shape, or a shape of bundled wires, of which the diameter is 1 mm or less, for example. The flake shape is a sheet-like shape, or a shape of stacked sheets, of which the thickness is 1 mm or less, for example. The mesh shape is a shape of a sheet material provided with multiple penetration holes on the surface thereof, or a grid shape in which wires are arranged vertically and horizontally. The metal material preferably has a particle shape in view of preparation readiness when mixed with the oxygen-permeable material to form the uniform electrically conductive layer 12. The electrically conductive layer 12 may include a single metal material having a particle shape, a wire shape, a flake shape, or a mesh shape. Alternatively, the electrically conductive layer 12 may include metal materials having any of a particle shape, a wire shape, a flake shape, and a mesh shape in combination.

As described above, the thickness of the electrically conductive layer 12 is preferably 1 mm or less. When the metal material has a wire shape, the diameter of the metal material is therefore preferably 1 mm or less. The lower limit of the diameter of the metal material is preferably, but not necessarily, 1 µm or greater. When the metal material has a flake shape or a mesh shape, the thickness of the metal material is preferably 1 mm or less. The lower limit of the thickness of the metal material is preferably, but not necessarily, 1 µm or greater. The diameter and thickness of the metal material 20 may be measured through observations with an optical microscope or a scanning electron microscope, as in the case described above.

The electrically conductive layer 12 preferably has electrical resistivity of 2 $\Omega$m or less. Namely, the electrical resistivity in the stacked direction Y of the first diffusion layer 11, the electrically conductive layer 12, and the second diffusion layer 13 is preferably 2 $\Omega$m or less. In addition, the electrically conductive layer 12 preferably has electrical resistivity of 2 $\Omega$m or less also in both directions X and Z orthogonal to the stacked direction Y of the first diffusion layer 11, the electrically conductive layer 12, and the second diffusion layer 13. The electrical resistivity of the electrically conductive layer 12 set to 2 $\Omega$m or less leads to a low internal resistance of the cathode 1, so as to prevent a reduction in output power of electrical energy. The lower limit of the electrical resistivity of the electrically conductive layer 12 may be, but not limited to, 0.10 µ$\Omega$·m or greater. The electrical resistivity may be measured by a four-point probe method, for example.

The electrically conductive layer 12 preferably has an oxygen transmission rate of 10,000 cc/m$^2$·24 h·atm or greater and 720,000 cc/m$^2$·24 h·atm or less. More preferably, the oxygen transmission rate in the stacked direction Y of the first diffusion layer 11, the electrically conductive layer 12, and the second diffusion layer 13 is 10,000 cc/m$^2$·24 h·atm or greater and 720,000 cc/m$^2$·24 h·atm or less. The oxygen transmission rate of the electrically conductive layer 12 set to 720,000 cc/m$^2$·24 h·atm or less can prevent a large amount of oxygen from being supplied from the gas phase to the liquid phase through the electrically conductive layer 12 to result in excessive dissolution in the liquid phase. Accordingly, a decrease in decomposition activity of the organic matter due to anaerobic microorganisms present in the liquid phase can be prevented. The oxygen transmission rate of the electrically conductive layer 12 set to 10,000 cc/m$^2$·24 h·atm or greater can minimize a decrease of a reduction reaction rate in the second diffusion layer 13. The oxygen transmission rate of the electrically conductive layer 12 may be obtained according to JIS K7126-1 (Plastics-Film and sheeting-Determination of gas-transmission rate-Part 1: Differential-pressure method) or JIS K7126-2 (Plastics-Film and sheeting-Determination of gas-transmission rate-Part 2: Equal-pressure method).

The electrically conductive layer 12 is not in direct contact with the liquid phase since the second diffusion layer 13 is interposed between the electrically conductive layer 12 and the liquid phase. The electrically conductive layer 12, however, preferably has water repellency. The electrically conductive layer 12 including the oxygen-permeable material such as silicone and the metal material 20 by mixture has water repellency. Thus, corrosion of the electrically conductive layer 12 caused by infiltration of liquid from the liquid phase through the second diffusion layer 13 can be suppressed with high accuracy.

The second diffusion layer 13 supports the catalyst layer 30 thereon, and is impregnated with the liquid phase including the organic matter. The second diffusion layer 13 promotes with high efficiency the reduction reaction due to oxygen ($O_2$) supplied from the first diffusion layer 11 and the electrically conductive layer 12, electrons ($e^-$) collected in the anode and supplied via an external circuit, and protons ($H^+$) supplied from the liquid phase side. The second diffusion layer 13 has any shape which can support, on the surface thereof, an electrode catalyst included in the catalyst layer 30. In order to further enhance the catalytic activity per unit mass in the cathode 1, the second diffusion layer 13 is preferably an aggregation of fibrous substances having a larger specific surface area per unit mass. As the specific surface area is larger, the second diffusion layer 13 typically can ensure a larger supporting area. When the second diffusion layer 13 is an aggregation of fibrous substances, such as a nonwoven fabric, the second diffusion layer 13 can increase the dispersibility of a catalyst component on the surface of the second diffusion layer 13, and support a larger amount of the electrode catalyst on the surface thereof. The second diffusion layer 13 does not have water repellency, which is different from the first diffusion layer 11, in order to increase the contact area in contact with the liquid phase to promote the reduction reaction, as described above.

A preferred example of the material used for the second diffusion layer 13 is a nonwoven fabric or film including at least one material selected from the group consisting of polyethylene, polypropylene, nylon, and polytetrafluoroethylene (PTFE). The material for the second diffusion layer 13 may also be a carbon material such as carbon paper, carbon cloth, and carbon felt.

The catalyst layer 30 includes an electrode catalyst having preferred reaction activity, and a binder for binding the electrode catalyst to the second diffusion layer 13. The catalyst layer 30 is provided on the opposite side of the electrically conductive layer 12 with the second diffusion layer 13 interposed therebetween. Namely, the electrically conductive layer 12, the second diffusion layer 13, and the catalyst layer are sequentially arranged in layers.

The electrode catalyst included in the catalyst layer 30 is preferably an oxygen reduction catalyst when used for a fuel cell. A preferred example of the oxygen reduction catalyst is a platinum group catalyst including at least one element selected from the group consisting of platinum, palladium, rhodium, ruthenium, and iridium. The platinum group catalyst is also preferably obtained such that at least one element selected from the group consisting of platinum, palladium, rhodium, ruthenium, and iridium is supported on activated carbon. The catalyst layer 30 may include carbon particles doped with at least one kind of nonmetal atoms and metal atoms. The nonmetal atoms with which the carbon particles are doped may be, but not limited to, nitrogen atoms, boron atoms, sulfur atoms, and phosphorus atoms. The doped metal atoms may be iron atoms or copper atoms.

The binder included in the catalyst layer 30 may be an ion-conducting resin. The ion-conducting resin is not limited to any particular material and may be referred to the findings known in the art. The ion-conducting resin is classified broadly into a fluoride-based polymer electrolyte and a hydrocarbon-based polymer electrolyte, depending on the type of ion exchange resin used for the ion-conducting resin. Examples of ion exchange resins included in the fluoride-based polymer electrolyte include: a perfluorocarbon sulfonic acid polymer such as Nafion (available from DuPont Company), Aciplex (available from Asahi Kasei Corporation), and Flemion (available from Asahi Glass Co., Ltd.); a perfluorocarbon phosphonic acid polymer; a trifluorostyrene sulfonic acid polymer; an ethylene tetrafluoroethylene-g-styrene sulfonic acid polymer; an ethylene-tetrafluoroethylene copolymer; and a polyvinylidene fluoride-perfluorocarbon sulfonic acid polymer.

As described above, the second diffusion layer 13 supports the catalyst layer 30 on the surface thereof. In particular, as shown in FIG. 1, the catalyst layer 30 may be bonded to a surface 13b of the second diffusion layer 13, which is the other surface opposite to a surface 13a toward the electrically conductive layer 12. The present embodiment is, however, not limited to the catalyst layer 30 supported in a layered state. For example, at least one of the electrode catalyst and the carbon particles included in the catalyst layer 30 may adhere to the inside of a porous body included in the second diffusion layer 13. The configuration in which at least one of the electrode catalyst and the carbon particles adheres to the inside of the porous body, can also promote the reduction reaction due to oxygen, electrons, and protons with high efficiency.

Examples of methods of bonding the first diffusion layer 11, the electrically conductive layer 12, and the second diffusion layer 13 include fusion bonding, and bonding with resin. In view of durability, the method is preferably fusion bonding. Alternatively, the oxygen-permeable material such as silicone included in the electrically conductive layer 12 may serve as a bonding resin.

According to the configuration described above, the electrically conductive layer 12 is interposed between the first diffusion layer 11 and the second diffusion layer 13, and is not in direct contact with the liquid phase. The electrically conductive layer 12 is therefore prevented from corrosion caused by a component of the liquid phase itself, such as hydrogen ions or chloride ions, or corrosion caused by microorganisms. In addition, the electrically conductive layer 12 including the oxygen-permeable material can allow oxygen to pass therethrough to be supplied from the gas phase via the first diffusion layer 11 toward the second diffusion layer 13 with high efficiency. Further, the electrically conductive layer 12 functions to transmit electrons generated in the anode, and promote the reaction between oxygen supplied from the gas phase and hydrogen ions transferred through the ion transfer layer. The electrically conductive layer 12 including the metal material has high electrical conductivity, so as to increase the efficiency of the reduction reaction of oxygen. The scaled-up cathode 1 still can minimize an increase in internal resistance, so as to suppress a reduction of the electrical energy generated by the oxidation-reduction reaction.

(1-2. Modified Example of Configuration of Electrode (Cathode))

Figure 2:
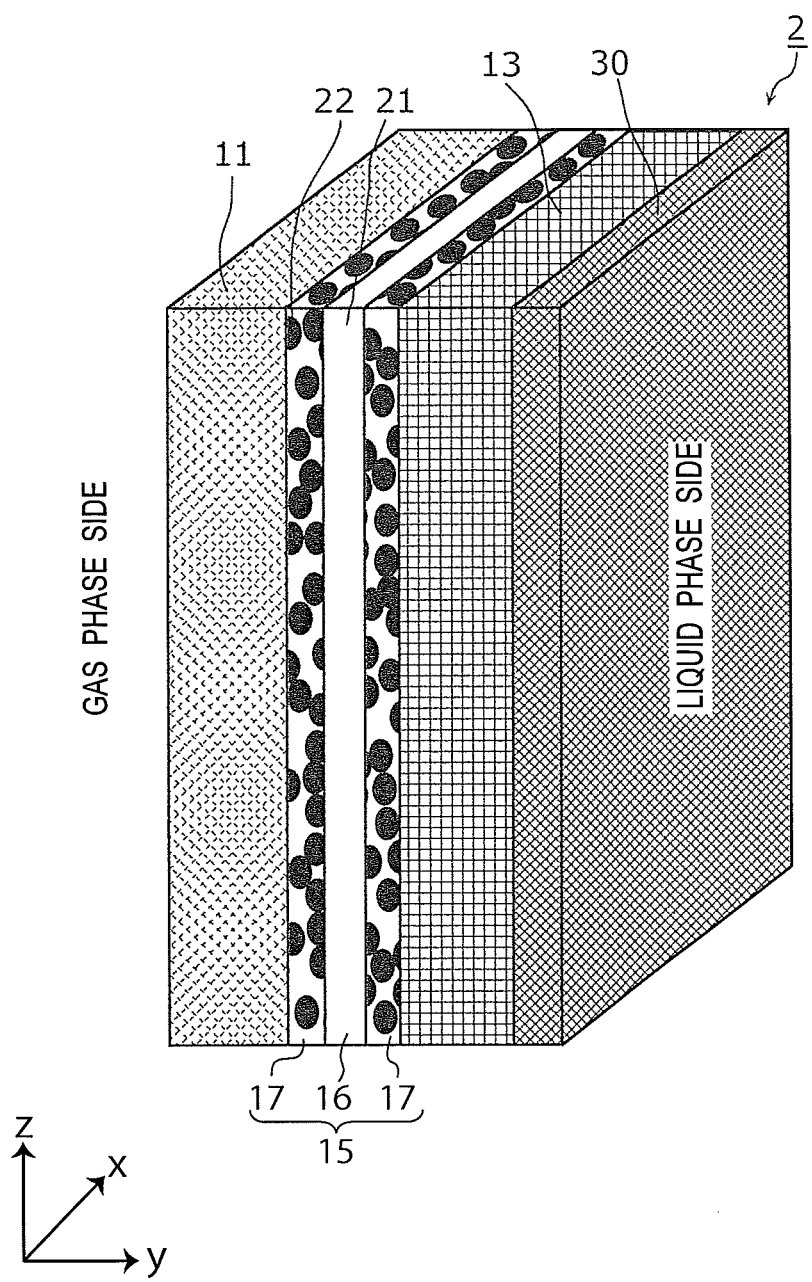
FIG. 2 is a perspective view showing another example of the cathode according to the first embodiment.

Next, a modified example of the electrode according to the present embodiment is described below. FIG. 2 is a perspective view showing another example of the cathode according to the first embodiment. As shown in FIG. 2, a cathode 2 includes the first diffusion layer 11, an electrically conductive layer 15, and the second diffusion layer 13. The cathode 2 of the modified example differs from the cathode 1 according to the first embodiment only in the configuration of the electrically conductive layer 15. Hereinafter, different points are mainly described, while explanations of the same points as in the cathode 1 are not repeated below.

The electrically conductive layer 15 includes a metal material 21 and a carbon material 22. The metal material 21 includes the same ingredients as the metal material 20, and may have a particle shape, or a wire shape, a flake shape, or a mesh shape. The carbon material 22 may also have various kinds of shape in addition to a particle shape. According to the modified example, the carbon material 22 is provided in contact with both surfaces of a layer including the metal material 21.

The electrically conductive layer 15 further includes an oxygen-permeable material together with the metal material 21 and the carbon material 22. In particular, the electrically conductive layer 15 includes a metal material layer 16 in which the ingredients of the metal material 21 are dispersed in the oxygen-permeable material, and carbon material layers 17 in which ingredients of the carbon material 22 are dispersed in the oxygen-permeable material. The ingredients of the metal material 21 are electrically connected to each other inside the metal material layer 16. The ingredients of the carbon material 22 are electrically connected to each other inside the carbon material layer 17. The electrically conductive layer 15 has a configuration in which both surfaces of the metal material layer 16 are held by the carbon material layers 17.

The oxygen-permeable material included in the electrically conductive layer 15 is preferably silicone, for example, as in the case of that included in the electrically conductive layer 12 according to the first embodiment. The oxygen-permeable material is also preferably, instead of silicone, at least one compound selected from the group consisting of poly(dimethylsiloxane), ethyl cellulose, poly-4-methylpentene-1, polybutadiene, polytetrafluoroethylene, and butyl rubber. The carbon material 22 is preferably at least one material selected from the group consisting of graphene, carbon nanotube, fullerene, carbon black, carbon fiber, and graphite.

According to the configuration described above, the electrically conductive layer 15 having an electrically conductive function in the cathode 2 is not in direct contact with the liquid phase. The electrically conductive layer 15 is therefore prevented from corrosion caused by a component of the liquid phase itself, such as hydrogen ions or chloride ions, or corrosion caused by microorganisms, as in the case of the electrically conductive layer 12 according to the first embodiment. In addition, the electrically conductive layer 15 including the oxygen-permeable material can allow oxygen to pass therethrough to be supplied from the gas phase via the first diffusion layer 11 toward the second diffusion layer 13 with high efficiency. Further, the electrically conductive layer 15 functions to transmit electrons generated in the anode, and promote the reaction between oxygen supplied from the gas phase and hydrogen ions transferred through the ion transfer layer. The electrically conductive layer 15 including the metal material has high electrical conductivity, so as to increase the efficiency of the reduction reaction of oxygen. The scaled-up cathode 2 still can minimize an increase in internal resistance, so as to prevent a reduction of the electrical energy generated by the oxidation-reduction reaction.

According to the modified example, the electrically conductive layer 15 includes not only the metal material 21 but also the carbon material 22. As compared with the cathode 1 ensuring electrical conductivity by including only the metal material 20, the cathode 2 has the advantages in easy availability of materials, cost, corrosion resistance, and durability. As described above, the electrically conductive layer 15 shown in FIG. 2 has a stacked structure including the metal material layer 16 in which the ingredients of the metal material 21 are dispersed in the oxygen-permeable material, and the carbon material layers 17 in which the ingredients of the carbon material 22 are dispersed in the oxygen-permeable material. However, the present embodiment is not limited to this configuration. For example, the electrically conductive layer 15 may be a single layer in which the metal material 21 and the carbon material 22 are mixed together and dispersed in the oxygen-permeable material.

Second Embodiment

The present embodiment will be illustrated by a fuel cell using the electrode according to the first embodiment.

As described above, the electrode according to the first embodiment can be used for a fuel cell. The fuel cell is a primary cell capable of discharging electricity, and examples thereof include a hydrogen fuel cell and a microbial fuel cell. A hydrogen fuel cell obtains electrical energy from hydrogen and oxygen through a reverse reaction of electrolysis of water. Examples of known hydrogen fuel cells include a polymer electrolyte fuel cell (PEFC), a phosphoric acid fuel cell (PAFC), an alkaline fuel cell (AFC), a molten carbonate fuel cell (MCFC), and a solid oxide fuel cell (SOFC). The electrode according to the first embodiment is particularly preferably used as an electrode for a microbial fuel cell. Thus, a microbial fuel cell will be described in detail below.

Figure 3:
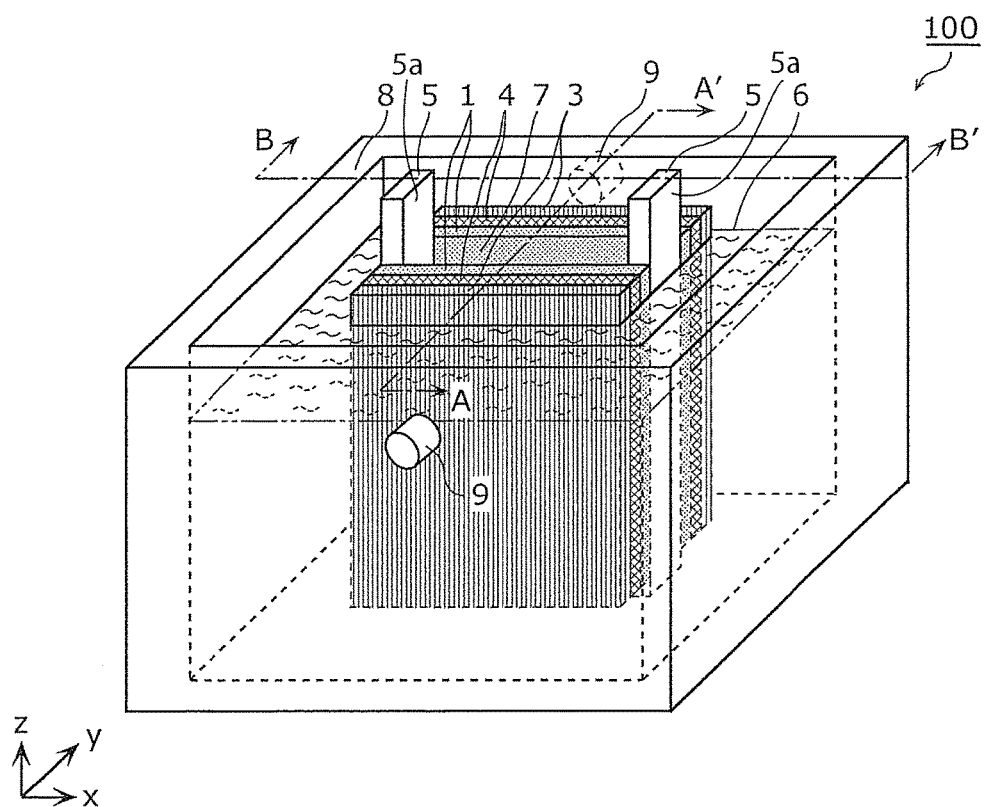
FIG. 3 is a schematic perspective view showing a configuration of a microbial fuel cell according to a second embodiment.
Figure 4:
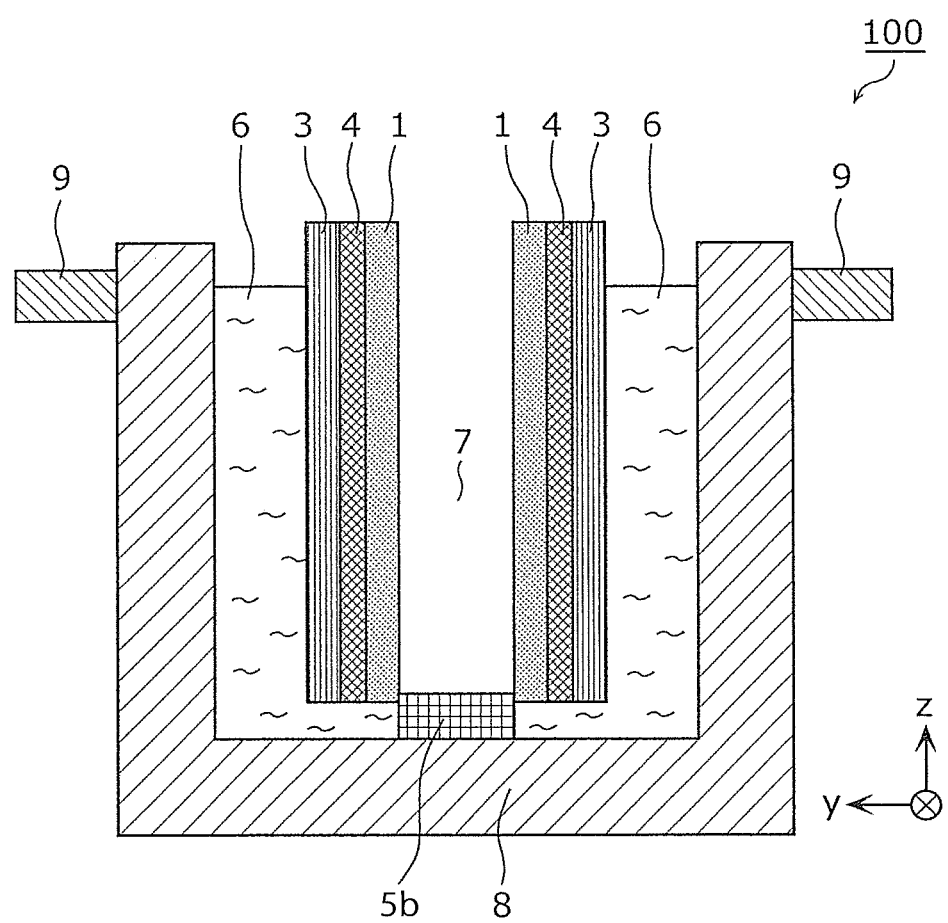
FIG. 4 is a cross-sectional view taken along line A-A' in FIG. 3.
Figure 5:
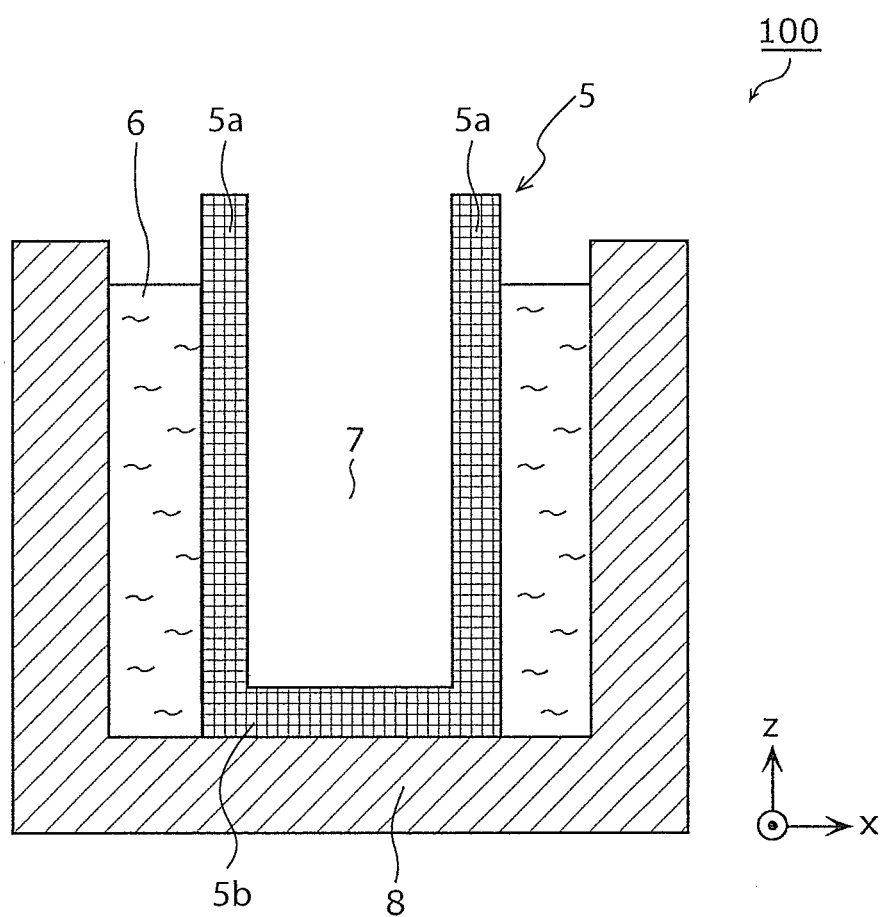
FIG. 5 is a cross-sectional view taken along line B-B' in FIG. 3.
Figure 6:
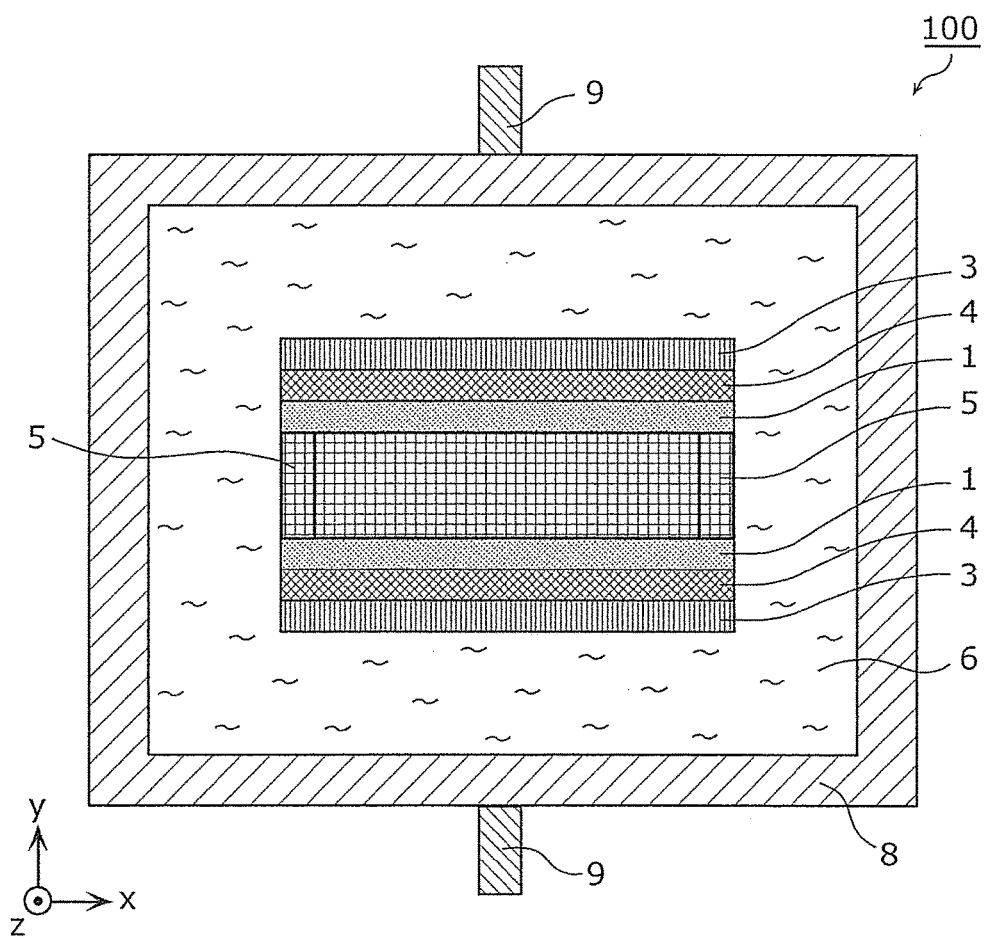
FIG. 6 is a plan view showing a configuration of the microbial fuel cell according to the second embodiment.

FIG. 3 is a schematic perspective view showing a configuration of a microbial fuel cell according to the second embodiment. FIG. 4 is a cross-sectional view taken along line A-A' in FIG. 3. FIG. 5 is a cross-sectional view taken along line B-B' in FIG. 3. FIG. 6 is a plan view showing a configuration of the microbial fuel cell according to the second embodiment. As shown in FIG. 3 to FIG. 6, the microbial fuel cell 100 includes the cathode 1, an anode 3, an ion transfer layer 4, a cassette substrate 5, an electrolysis solution 6, and a container 8. The space defined by the electrode 1 and the cassette substrate 5 is a gas phase 7, which is filled with air, for example. The container 8 is a wastewater tank provided with inlet and outlet ports 9. Wastewater flows into and discharged from the container 8 through the inlet and outlet ports 9. The electrolysis solution 6 as wastewater includes organic matter. The electrolysis solution 6 circulates through and in contact with the surface of the anode 3 holding microorganisms, and is subjected to wastewater treatment.

(2-1. Principle of Microbial Fuel Cell 100)

Next, the principle of the microbial fuel cell 100 is described below.

The anode 3 collects electrons generated when the organic matter in the electrolysis solution 6 is oxidized and decomposed by the microorganisms, according to the following expression 1. The electrons collected in the anode 3 are transferred to the cathode 1 via an external circuit connected to the anode 3 and the cathode 1.

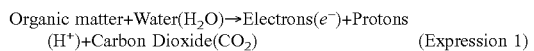

Organic matter+Water($H_2O$)→Electrons($e^-$)+Protons ($H^+$)+Carbon Dioxide($CO_2$)  (Expression 1)

The cathode 1 generates water by use of oxygen supplied from the gas phase 7, protons passing through the ion transfer layer 4 from the anode 3, and electrons transferred via the external circuit, according to the following expression 2.

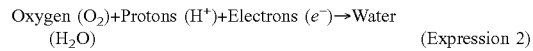

Oxygen ($O_2$)+Protons ($H^+$)+Electrons ($e^-$)→Water ($H_2O$)  (Expression 2)

The electrons flow across the cathode 1 and the anode 3 according to a gradient of an oxidation-reduction potential based on the chemical reaction represented by the expression 1 caused in the anode 3 and the chemical reaction represented by the expression 2 caused in the cathode 1. Accordingly, the electrical energy corresponding to the product of an electric potential difference between the cathode and the anode and an electric current flowing through the external circuit, is obtained in the external circuit. Namely, the microbial fuel cell 100 can generate electricity while reducing the amount of sludge generated due to the wastewater treatment in the electrolysis solution 6.

(2-2. Configuration of Microbial Fuel Cell 100)

The microbial fuel cell 100 includes the cathode 1 arranged to surround the cassette substrate 5. As shown in FIG. 3 and FIG. 4, the ion transfer layer 4 is arranged on the outside of the cathode 1, and the anode 3 is arranged on the outside of the ion transfer layer 4.

A unit composed of the cassette substrate 5, the cathode 1, the ion transfer layer 4, and the anode 3 is impregnated with the electrolysis solution 6 in the container 8. The space defined by the cassette substrate 5 and the cathode 1 is not in contact with the electrolysis solution 6, so as to serve as the gas phase 7. According to the present embodiment, an assembly of the cathode 1, the ion transfer layer 4, and the anode 3 is provided on both sides of the cassette substrate 5, but may be provided only on one side of the cassette substrate 5.

The cathode 1, which is the electrode according to the first embodiment, is separated from the anode 3 with the ion transfer layer 4 interposed therebetween. The cathode 1 is a gas diffusion electrode for promptly supplying oxygen contained in the gas phase 7. The cathode 1 is an electrode into which electrons flow from the external circuit through the oxygen reduction reaction. The cathode 1 according to the present embodiment may be replaced with the cathode 2 according to the modified example of the first embodiment.

The anode 3 is an electrode which holds the microorganisms included in the electrolysis solution 6 on the surface thereof, and allows electrons to pass therethrough to flow into the external circuit through a decomposition reaction of the organic matter of the microorganisms. The microorganisms held in the anode 3 are preferably anaerobic microorganisms, and are preferably electricity-producing bacteria having an extracellular electron transfer mechanism, for example. Specific examples of anaerobic microorganisms include *Geobacter, Shewanella, Aeromonas, Geothrix*, and *Saccharomyces*.

The anode 3 preferably has continuous spaces in the thickness direction in order to hold the microorganisms on the surface thereof. In particular, the anode 3 may be an electrically conductive sheet having voids, such as a porous or mesh-like electrically conductive sheet. Alternatively, the anode 3 may be a metal plate having a plurality of penetration holes in the thickness direction. Examples of materials used for the anode 3 include electrically conductive metal such as aluminum, copper, stainless steel, nickel, and titanium, and a carbon material such as carbon paper and carbon felt.

The anode 3 may be modified with an electron transport mediator molecule. Alternatively, the electrolysis solution 6 in the container 8 may include an electron transport mediator molecule. The presence of this molecule can promote the electron transfer from the anaerobic microorganisms to the anode 3, so as to exhibit liquid treatment with higher efficiency.

More particularly, the communication of electrons between the anode 3 and cells or a terminal electron acceptor is implemented by a metabolism mechanism of the anaerobic microorganisms. Once the mediator molecule is introduced into the electrolysis solution 6, the mediator molecules serves as a terminal electron acceptor, and transfers the received electrons to the anode 3. Accordingly, the rate of oxidation decomposition of the organic matter and the like in the electrolysis solution 6 can be increased. An example of such an electron transport mediator molecule may be, but not limited to, at least one material selected from the group consisting of neutral red, anthraquinone-2,6-disulfonate (AQDS), thionine, potassium ferricyanide, and methyl viologen.

The ion transfer layer 4 is a membrane having permeability for protons generated in the anode 3. The ion transfer layer 4 preferably does not allow oxygen held in the cathode 1 to pass therethrough toward the anode 3. In view of this, the ion transfer layer 4 is preferably a porous body. Examples of materials used for the ion transfer layer 4 include an ion exchange membrane, a glass fiber membrane, a synthetic fiber membrane, and a plastic nonwoven fabric. The ion transfer layer 4 is only required to have proton permeability, and further allows other substances in addition to protons to pass therethrough. The permeation is not necessarily in one direction from the anode 3 toward the cathode 1, but the ion transfer layer 4 may allow two-way permeation.

The second diffusion layer 13 in the cathode 1 is in contact with the ion transfer layer 4, and is impregnated with a component including protons contained in the electrolysis solution 6 through the ion transfer layer 4.

The cassette substrate 5 serves as a frame member for fixing the assembly of the cathode 1, the ion transfer layer 4, and the anode 3, and also as a spacer for ensuring a space for the gas phase 7 in contact with the cathode 1. More particularly, as shown in FIG. 3 and FIG. 4, the cassette substrate 5 is a U-shaped frame member extending along the outer periphery of the first diffusion layer 11 in the cathode 1, and open on the upper side. Namely, the cassette substrate 5 is a frame member in which bottoms of two first pillar-shaped members 5a are connected to each other with a second pillar-shaped member 5b. The side surface of the cassette substrate 5 is joined to the outer periphery of the first diffusion layer 11 on one surface opposite to the electrically conductive layer 12 in the cathode 1, so as to prevent the electrolysis solution 6 from leaking into the inside of the cassette substrate 5 from the outer periphery of the first diffusion layer 11. A preferred example of the material used for the cassette substrate 5 is vinyl chloride.

According to the configuration of the second embodiment, the electrically conductive layer 12 having a current collecting function in the cathode 1 is not in direct contact with the liquid phase. The metal material 20 included in the electrically conductive layer 12 is therefore prevented from corrosion caused by a component of the liquid phase itself or caused by microorganisms. In addition, the electrically conductive layer 12 including the oxygen-permeable material can allow oxygen to pass therethrough to be supplied from the gas phase via the first diffusion layer 11 toward the second diffusion layer 13 with high efficiency. The electrically conductive layer 15 functions to transmit electrons generated in the anode, and promote the reaction between oxygen supplied from the gas phase and hydrogen ions transferred through the ion transfer layer. The electrically conductive layer 15 including the metal material has high electrical conductivity, so as to increase the efficiency of the reduction reaction of oxygen. Further, the scaled-up cathode 1 still can minimize an increase in internal resistance, so as to prevent a reduction of the electrical energy generated by the oxidation-reduction reaction. In other words, since the electrically conductive layer having high electrically conductive characteristics and high oxygen permeability is not brought into contact with waste liquid, the microbial fuel cell 100 prevented from corrosion and capable of ensuring high output power can be achieved while being scaled up.

[Effects]

The cathode 1 according to the first embodiment includes the first diffusion layer 11 having water repellency and functioning to diffuse oxygen, and the second diffusion layer 13 supporting the catalyst layer 30 thereon and functioning to diffuse oxygen. The cathode 1 further includes the electrically conductive layer 12 including the metal material 20 and the oxygen-permeable material, and interposed between the first diffusion layer 11 and the second diffusion layer 13.

The electrically conductive layer 12 having an electrically conductive function in the cathode 1 is interposed between the first diffusion layer 11 and the second diffusion layer 13, and is not in direct contact with the liquid phase. The electrically conductive layer 12 is therefore prevented from corrosion caused by a component of the liquid phase itself, or corrosion caused by microorganisms. As a result, the high electrically conductive capability of the electrically conductive layer 12 can be maintained for a long period of time, which suppresses deterioration of the cell characteristics. Further, since the electrically conductive layer 12 includes the metal material 20 and the oxygen-permeable material, the scaled-up cathode 1 still can minimize an increase in internal resistance, so as to suppress a reduction of the electrical energy generated by the oxidation-reduction reaction.

The electrical resistivity of the electrically conductive layer 12 set to 2 Ωm or less minimizes an increase in internal resistance of the cathode 1, so as to prevent a reduction of output power of the electrical energy. The oxygen transmission rate set to 720,000 cc/m$^2$·24 h·atm or less can prevent a large amount of oxygen from being supplied from the gas phase to the liquid phase through the electrically conductive layer 12 to result in excessive dissolution in the liquid phase. As a result, a decrease in decomposition activity of the organic matter due to anaerobic microorganisms present in the liquid phase can be prevented. The oxygen transmission rate set to 10,000 cc/m$^2$·24 h·atm or greater can minimize a decrease of the reduction reaction rate in the second diffusion layer 13. Thus, the electrically conductive layer 12 preferably has the electrical resistivity of 2 Ωm or less, and the oxygen transmission rate in the range of 10,000 cc/m$^2$·24 h·atm or greater and 720,000 cc/m$^2$·24 h·atm or less. Accordingly, the high output power can be maintained.

The oxygen-permeable material is preferably silicone. This material can provide the electrically conductive layer 12 having oxygen permeability formed by a simplified process with reduced costs.

The metal material 20 may have a particle shape. The electrically conductive layer 12 including the mixture of the metal material and the oxygen-permeable material can therefore be formed evenly with easy material adjustment.

The metal material may also have a flake shape or a wire shape. Such a shape facilitates the formation of the electrically conductive layer having electrical conductivity and oxygen permeability.

The electrically conductive layer 15 may further include a carbon material. As compared with the cathode ensuring electrical conductivity by including only the metal material, the cathode further including the carbon material has the advantages in easy availability of materials, cost, corrosion resistance, and durability.

The microbial fuel cell 100 according to the second embodiment includes the anode 3 holding the microorganisms, the ion transfer layer 4 having permeability of protons from the anode 3, and the cathode 1 according to the first embodiment, the cathode 1 being separated from the anode 3 with the ion transfer layer 4 interposed therebetween.

According to this configuration, the electrically conductive layer 12 having an electrically conductive function in the cathode 1 is not in direct contact with the liquid phase. The metal material 20 included in the electrically conductive layer 12 is therefore prevented from corrosion caused by a component of the liquid phase itself, such as hydrogen ions or chloride ions, or caused by microorganisms. As a result, the high current collecting capability of the cathode 1 can be maintained, which suppresses deterioration of the cell characteristics. Further, since the electrically conductive layer 12 having a current collecting function includes the metal material and the oxygen-permeable material, the scaled-up cathode 1 still can minimize an increase in internal resistance, so as to suppress a reduction of the electrical energy generated by the oxidation-reduction reaction. In other words, since the electrically conductive layer having high electrically conductive characteristics and high oxygen permeability is not brought into contact with waste liquid, the fuel cell prevented from corrosion and capable of ensuring high output power can be achieved while being scaled up.

The first diffusion layer 11 in the cathode 1 may be arranged so as to be brought into contact with gas containing oxygen. The second diffusion layer 13 in the cathode 1 may be arranged so as to be brought into contact with the electrolysis solution 6 including microorganisms.

The electrolysis solution 6 may include organic matter. The oxidization and decomposition of the organic matter in the electrolysis solution 6 by the microorganisms can generate electricity while reducing the amount of sludge generated in the electrolysis solution 6.

The anode 3 may be a porous body or a mesh-like electrically conductive sheet. The anode 3 of this type can hold the microorganisms with high density, and promote the reaction of oxidation and decomposition of the organic matter by the microorganisms.

The ion transfer layer 4 may be a porous body or a nonwoven fabric. The ion transfer layer 4 of this type allows protons generated in the anode 3 to pass therethrough toward the cathode.

Although the electrode and the fuel cell according to the first embodiment, the second embodiment, and the modified example are described above, the present invention is not intended to be limited to these embodiments and the modified example.

The cathode 1, the ion transfer layer 4, and the anode 3 are each formed into a plate shape in the first embodiment and the second embodiment; however, the electrode configuration is not limited thereto. For example, the cathode 1, the ion transfer layer 4, and the anode 3 may each be formed into any of a cylindrical shape, a block shape, and a cassette shape.

The second embodiment has been illustrated by the microbial fuel cell 100 as an example of a fuel cell according to the present embodiment. The fuel cell according to the present embodiment, however, may be other cells, instead of MFC, such as a hydrogen fuel cell.

The cathode 1 and the cathode 2 described above are not necessarily used as a cathode for the microbial fuel cell 100, and may be used for other purposes. For example, the cathode 1 and the cathode 2 may be used as electrodes for water treatment equipment for modifying the quality of water into appropriate one so as to be used for intended purposes, or for draining water while not affecting the environment.

The cathode 1 and the cathode 2 described above are not necessarily used as a cathode for the microbial fuel cell 100, and may be used for various types of electrochemical devices. Examples of such electrochemical devices include a device for water electrolysis, a carbon dioxide permeation device, a device for brine electrolysis, a metal-air cell, and a metal lithium-air cell.

In case the assembly including the cathode 1, the ion transfer layer 4, and the anode 3 is bent due to water pressure, a spacer for keeping the configuration of the assembly is preferably inserted into the cathode 1. The spacer is not limited to any particular shape, but is required to be configured to supply oxygen sufficiently to the first diffusion layer 11 and the second diffusion layer 13 in such a manner as to use a porous material or a material provided with a plurality of slits.

The entire content of Japanese Patent Application No. P2014-185340 (filed on Sep. 11, 2014) is herein incorporated by reference.

While the present invention has been described above by reference to the embodiments, the present invention is not intended to be limited to the descriptions thereof, and various modifications and improvements will be apparent to those skilled in the art.

INDUSTRIAL APPLICABILITY

The electrode according to the present invention can minimize an internal resistance of a cell while being prevented from corrosion derived from a liquid phase. The fuel cell according to the present invention, which uses the present electrode, can keep high power generation performance for a long period of time. The water treatment equipment according to the present invention, which uses the present electrode, can keep purifying wastewater efficiently for a long period of time.

REFERENCE SIGNS LIST 1, 2 CATHODE
3 ANODE
4 ION TRANSFER LAYER
6 ELECTROLYSIS SOLUTION (LIQUID TO BE TREATED)
7 GAS PHASE (GAS)
11 FIRST DIFFUSION LAYER
12, 15 ELECTRICALLY CONDUCTIVE LAYER
13 SECOND DIFFUSION LAYER
20, 21 METAL MATERIAL
22 CARBON MATERIAL

30 CATALYST LAYER
100 MICROBIAL FUEL CELL (FUEL CELL)

The invention claimed is:

1. An electrode comprising:
a first diffusion layer having water repellency and functioning to diffuse oxygen;
a second diffusion layer supporting a catalyst layer thereon and functioning to diffuse oxygen; and
an electrically conductive layer including a metal material and an oxygen-permeable material, the electrically conductive layer interposed between the first diffusion layer and the second diffusion layer, the metal material being dispersed in the oxygen-permeable material,
wherein ingredients of the metal material are electrically connected to each other inside the electrically conductive layer, and
wherein the electrically conductive layer has an oxygen transmission rate of 10,000 cc/m$^2 \cdot$24 h$\cdot$atm or greater and 720,000 cc/m$^2 \cdot$24 h$\cdot$atm or less.

2. The electrode according to claim 1, wherein the electrically conductive layer has electrical resistivity of 2 $\Omega$m or less.

3. The electrode according to claim 1, wherein the oxygen-permeable material is silicone.

4. The electrode according to claim 1, wherein the metal material has a particle shape.

5. The electrode according to claim 1, wherein the metal material has a flake shape or a wire shape.

6. The electrode according to claim 1, wherein the electrically conductive layer further includes a carbon material.

7. A fuel cell comprising:
an anode;
an ion transfer layer having proton permeability; and
a cathode being the electrode according to claim 1, and separated from the anode with the ion transfer layer interposed therebetween.

8. The fuel cell according to claim 7,
wherein the first diffusion layer in the cathode is arranged so as to be brought into contact with gas containing oxygen; and
wherein the second diffusion layer in the cathode is arranged so as to be brought into contact with a liquid to be treated including microorganisms.

9. The fuel cell according to claim 8, wherein the liquid to be treated includes organic matter.

10. The fuel cell according to claim 7, wherein the anode is a porous body, or a mesh-like electrically conductive sheet.

11. The fuel cell according to claim 7, wherein the ion transfer layer is a porous body, or a nonwoven fabric.

12. A water treatment equipment comprising:
an anode;
an ion transfer layer having proton permeability; and
a cathode being the electrode according to claim 1, and separated from the anode with the ion transfer layer interposed therebetween.

13. An electrode comprising:
a first diffusion layer having water repellency and functioning to diffuse oxygen;
a second diffusion layer supporting a catalyst layer thereon and functioning to diffuse oxygen; and
an electrically conductive layer including a metal material and an oxygen-permeable material, and interposed between the first diffusion layer and the second diffusion layer,
wherein the electrically conductive layer has electrical resistivity of 2 $\Omega$m or less, and an oxygen transmission rate of 10,000 cc/m$^2 \cdot$24 h$\cdot$atm or greater and 720,000 cc/m$^2 \cdot$24 h$\cdot$atm or less.

* * * * *